United States Patent
Holiday, II

[11] Patent Number: 6,115,457
[45] Date of Patent: Sep. 5, 2000

[54] MARKING AND SCREENING TELEPHONE CALLS

[75] Inventor: Matthew R. Holiday, II, Allen, Tex.

[73] Assignee: Northern Telcom Limited, Montreal, Canada

[21] Appl. No.: 08/990,109

[22] Filed: Dec. 12, 1997

[51] Int. Cl.[7] .................................................. H04M 15/00
[52] U.S. Cl. ........................ 379/120; 379/127; 379/243
[58] Field of Search ..................................... 379/127, 142, 379/199, 189, 201, 88.19, 67.01, 88.2, 88.21, 197, 120, 121, 128, 157, 208, 203, 211, 212, 221, 243

[56] References Cited

U.S. PATENT DOCUMENTS

| | | | |
|---|---|---|---|
| 5,033,076 | 7/1991 | Jones et al. | 379/142 |
| 5,388,150 | 2/1995 | Schneyer et al. | 379/142 |
| 5,550,904 | 8/1996 | Andruska et al. | 379/142 |
| 5,625,680 | 4/1997 | Foladare et al. | 379/127 |
| 5,651,053 | 7/1997 | Mitchell | 379/142 |
| 5,757,899 | 5/1998 | Boulware et al. | 379/142 |
| 5,832,072 | 11/1998 | Rozenblit | 379/142 |
| 5,867,562 | 2/1999 | Scherer | 379/127 |
| 5,926,537 | 7/1999 | Birze | 379/142 |

FOREIGN PATENT DOCUMENTS

| | | |
|---|---|---|
| 0 726 669 | 8/1996 | European Pat. Off. . |
| 2 308 271 | 6/1997 | United Kingdom . |

*Primary Examiner*—Curtis A. Kuntz
*Assistant Examiner*—Rexford Barnie
*Attorney, Agent, or Firm*—Haynes and Boone LLP

[57] ABSTRACT

A system and method that controls calls, such as telephone solicitations, by a calling party to a called party. A switch receives a call from the calling party and marks the call to identify it as a telephone solicitation. Such marking can be performed in various ways, such as altering a forward call indicator of an IAM message if the switch is using an ISUP procedure, or providing a station type with information digits used in multi-frequency signaling. After the call has been marked, it can then be identified by a switch serving the called party as a telephone solicitation. Once identified, the switch then analyzes a profile for the called party and determines how to complete the call. For example, if the profile indicates that the called party does not want to receive telephone solicitations, the call will not be completed to the called party, but instead will receive alternate treatment.

2 Claims, 1 Drawing Sheet

MARKING AND SCREENING TELEPHONE CALLS

TECHNICAL FIELD

The invention relates generally to signaling techniques in a telecommunication system and, more particularly, to a system and method for marking calls and allowing a called party to control receipt of the calls.

BACKGROUND OF THE INVENTION

Telephone solicitations, especially those that are not based on a prior relationship, or "cold calls", are often very time consuming and inefficient for both the calling and the called party. With respect to the calling party, or telemarketer, a great deal of time is wasted on unproductive phone calls, such as to called parties that are not at home or who are not receptive to such calls. With respect to the called party, or potential consumer, undesired solicitations can be an annoyance, especially at certain times of the day or night.

Typically, the attempted efforts to alleviate the above described problems have been directed to the potential consumer. In particular, the efforts have been centered around the calling parties identification number (CLID). For example, many local exchange companies provide an "anonymous call blocking" service which blocks calls with anonymous CLID's. However, this service has several problems. For one, it may block too many calls, such as calls from out-of-state pay phones and the like. For another, many telemarketers buy telecommunication lines that have no CLID. The anonymous call blocking service does not block these calls.

SUMMARY OF THE INVENTION

The foregoing problems are solved and a technical advance is achieved by a system and method that controls calls, such as telephone solicitations, by a calling party to a called party. In one embodiment, a switch receives a call from the calling party and marks the call to identify it as a telephone solicitation. Such marking can be performed in various ways, such as altering a forward call indicator of an IAM message if the switch is using an ISUP procedure, or providing a station type with information digits used in multi-frequency signaling.

After the call has been marked, it can then be identified by a switch serving the called party as a telephone solicitation. In some cases, the same switch that marks the call also identifies the call. Once identified, the switch then analyzes a profile for the called party and determines how to complete the call. For example, if the profile indicates that the called party does not want to receive telephone solicitations, the call will not be completed to the called party, but instead will receive alternate treatment.

An advantage achieved with the present invention is that the calling party does not waste any time calling parties who are unreceptive to such calls.

Another advantage achieved with the present invention is that the called party is not inconvenienced with unwanted calls at times when they are not desired, but can receive such calls at other predetermined times.

DESCRIPTION OF THE PREFERRED EMBODIMENT

Figure 1:
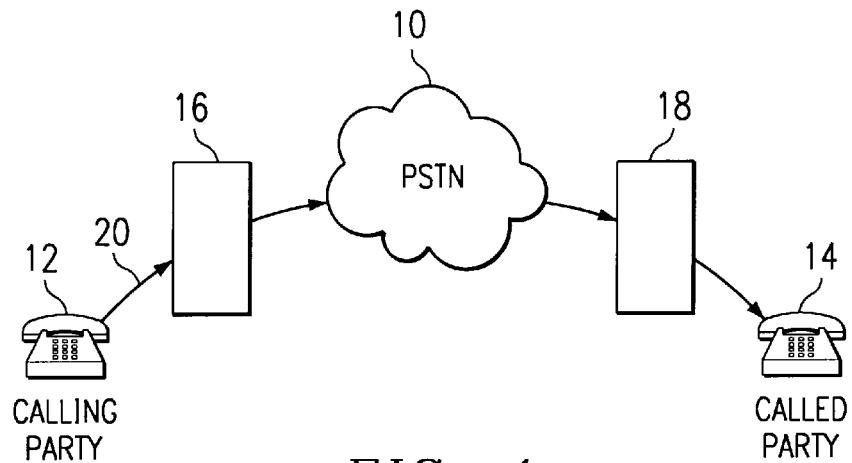
FIG. 1 is a block diagram of a telecommunication system.

Referring to FIG. 1, the reference numeral 10 designates a simplified public switched telephone network ("PSTN") that allows a calling party 12 to communicate with a called party 14. For the sake of example, the communication between the calling party 12 and called party 14 will be voice communications, although electronic, facsimile, and other types of communications are equally applicable. Furthermore, wireless networks or combination wired/wireless networks include similar functionality for purposes of the present example and therefore can readily implement the present invention.

The calling party 12 is connected to an originating switch 16 and the called party 14 is connected to a terminating switch 18. In continuance of the example, the switches 16, 18 are local exchange carriers, but may alternatively be any private branch exchange, central office or network switch capable of performing the method steps described below. Furthermore, switches 16 and 18 do not necessarily have to be the same type of switches.

The switches 16, 18 communicate using a standard protocol, such as signaling system 7 ("SS7"). It will be readily apparent to one of ordinary skill in the art that other types of communication protocol may alternatively be used to accomplish the method described below.

The calling party 12 is a telemarketer in a dedicated telemarketing facility (not shown). There are several ways to identify dedicated telemarketing facilities. For example, if a line 20 connecting the calling party 12 to the originating switch 16 is an "out-only" line, e.g., the line has an incoming line restriction, it is most likely a line used for telemarketing. However, to avoid confusion with other out-only lines, such as are used with pay telephones, a preferred embodiment would have the calling party 12 notify the originating switch 16 that it is a telemarketer. This notification can be done by many ways: it may be mandated, such as by governmental regulation; it may be required by the owner of the originating switch before service is provided; or it may be retroactively determined by previous complaints from other called parties (not shown).

Once the originating switch 16 is aware that the calling party 12 is a telemarketer, all future calls are marked accordingly. There are several potential ways in which to mark the call. Continuing the present example in which the SS7 protocol is used, an initial address message ("IAM"), which is part of an integrated services digital network user part ("ISUP") procedure for setting up the connection between the calling party 12 and called party 14, includes a series of forward call indicators and a calling party station type indicator. Either or both of these indicators of the IAM can be used by the originating switch 16 to mark the call so that other switches in the PSTN 10, including the terminating switch 18, can determine that the calling party 12 is a telemarketer.

If, however, the originating switch 16 does not facilitate ISUP procedures, but instead uses another communication protocol, the originating switch 16 can still mark calls indicating that the calling party 12 is a telemarketer. For example, if the originating switch 16 uses multi-frequency signaling, the switch already sends out information digits indicating a station type such as a hotel, a pay telephone, a prison, etc. Therefore, another station type can be made available to indicate a telemarketer. In this way, other switches in the PSTN 10, including the terminating switch 18, can determine the station type of the calling party 12.

Furthermore, the marking of calls can be translated from one communication protocol to another, depending on the individual requirements of lines and trunks used by the PSTN 10 to connect the calling party 12 to the called party 14.

The terminating switch 18 receives and handles the appropriately marked calls according to a profile established by the called party 14. The profile is a record indicating if and/or when the called party is willing to accept telephone solicitations. The profile may have global terms, such as "no telephone solicitations" or "all telephone solicitations", or may have predefined time periods for telephone solicitations, such as "weekdays from 9:00 a.m. to 5:00 p.m." Also, profiles may be unique to each customer, or there may be a limited number of predefined profiles, such as the three examples described above, from which the customer must choose. In the preferred embodiment, the profile is stored in a memory location of the terminating switch 18 before the called party is called.

Figure 2:
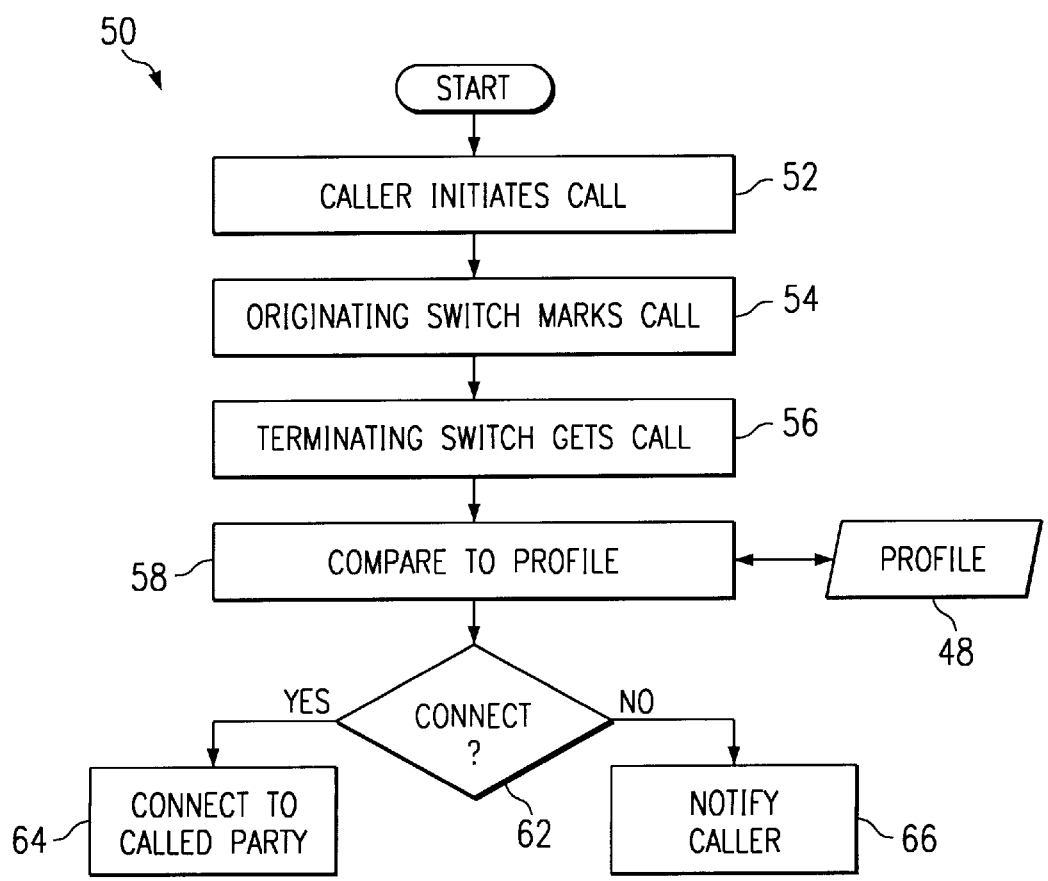
FIG. 2 is a flow chart of a method for use in the telecommunication system of FIG. 1.

Referring to FIG. 2, once the station type indicators have been defined and a profile 48 has been established, a routine 50 operates to facilitate telephone solicitations from the calling party 12 to the called party 14. At step 52, the calling party 12 initiates a call to the called party 14. At step 54, the originating switch 16 marks the call as one originating from a telemarketer. At step 56, the terminating switch receives the call. The step of receiving a call may include many intermediate steps depending on the protocol between the intermediate switches. These intermediate steps are conventional and well known by those of ordinary skill in the art and therefore, for the sake of brevity, will not be further discussed.

At step 58, the terminating switch 18 retrieves the station type from the marked call and compares the station type, along with the current day and date, with the profile 48. At step 62, the terminating switch 18 determines if the call should be completed to the called party 14. If the profile indicates that the called party 14 is accepting telephone solicitations at the present time, at step 64 the call is connected to the called party. If, however, the profile does not indicate that the called party 14 is accepting telephone solicitations, at step 66 the call is treated accordingly. Such treatment of the non-completed call can take many forms. For one, a tone can be placed on the call indicating that the call will not be completed. Alternatively, if the profile 48 indicates times that the called party is willing to accept telephone solicitations, the treatment may relay these acceptance times to the calling party 12.

Alternatively, the method 50 may be performed by a single switch. For example, if the calling party 12 and called party 14 share a common local exchange carrier ("LEC"), the LEC may perform all of steps 54 and 58–66 itself (step 56 is not required). Furthermore, the LEC may not mark the call at all, thereby skipping step 54 and proceeding directly to step 58.

In another embodiment, prior to step 64, the terminating switch 18 may also interpret the marking on the call so that if the called party has a "caller-ID" service, the caller-ID will properly indicate that the call is a telemarketing call.

Although illustrative embodiments of the invention have been shown and described, other modifications, changes, and substitutions are intended in the foregoing disclosure. For example, the above system and method may easily accommodate many different types of calls, and is not limited to telemarketing calls. Accordingly, it is appropriate that the appended claims be construed broadly and in a manner consistent with the scope of the invention.

What is claimed is:

1. A method for controlling calls from a calling party to a called party, the method comprising the steps of:

specifying, at a switch serving the calling party, a category of calls for marking;

specifying, at a switch serving the called party, a profile for the called party;

receiving, at the switch serving the called party, a call from the calling party serviced by the switch;

if the call is in the specified category, the switch serving the calling party marking the call to indicate that the call is in the specified category;

receiving the marked call at a switch servicing the called party;

the switch servicing the called party analyzing a profile for the called party; and the switch servicing the called party handling the call based upon the analysis of the profile for the called party;

wherein the specified category of calls is calls originating on a telephone line of a selected type and wherein the selected type of telephone line is an out-only line having restrictions against incoming calls.

2. A system for controlling calls by a calling party to a called party, the system comprising:

a switch for servicing the calling party, the switch servicing the calling party including:

instructions for marking calls of a specified category with an indicator of the specified category;

the switch servicing the called party including:

instructions for determining that the call is in specified category a memory for storing a profile for the called party;

instructions for analyzing the profile for the called party if the call is in the specified category;

instructions for handling the call based upon the analysis of the profile for the called party;

wherein the instructions for marking calls of a specified category with an indicator of the specified category further comprises instructions for marking calls originating on a telephone line of a selected type with an indicator that the call originated on the selected type of telephone line and wherein the instructions for marking calls originating on a telephone line of a selected type with an indicator that the call originated on the selected type of telephone line further comprises instructions for marking calls originating on an out-only line having restrictions against incoming calls with an indicator that the call originated on an out-only line having restrictions against incoming calls.

* * * * *